US009713827B2

(12) United States Patent
Bonneau et al.

(10) Patent No.: US 9,713,827 B2
(45) Date of Patent: Jul. 25, 2017

(54) DEVICE AND METHOD FOR DECONTAMINATING SURFACES COMPRISING ONE OR A PLURALITY OF TOXIC PRODUCTS

(71) Applicant: PERI-BAT, Norges-la-Ville (FR)

(72) Inventors: Jean-Pierre Bonneau, Vaux-Saules (FR); Cedric Bonneau, Talant (FR); Michael Bonneau, Poncey-sur-l'Ignon (FR); Vincent Bonneau, Chaignay (FR)

(73) Assignee: PERI-BAT, Norges-la-Ville (FR)

( * ) Notice: Subject to any disclaimer, the term of this patent is extended or adjusted under 35 U.S.C. 154(b) by 0 days.

(21) Appl. No.: 14/771,881

(22) PCT Filed: Mar. 10, 2014

(86) PCT No.: PCT/FR2014/050543
§ 371 (c)(1),
(2) Date: Sep. 1, 2015

(87) PCT Pub. No.: WO2014/135819
PCT Pub. Date: Sep. 12, 2014

(65) Prior Publication Data
US 2016/0016205 A1 Jan. 21, 2016

(30) Foreign Application Priority Data

Mar. 8, 2013 (FR) ...................................... 13 52127
Oct. 4, 2013 (FR) ...................................... 13 59638

(51) Int. Cl.
*B08B 7/04* (2006.01)
*B08B 3/02* (2006.01)
(Continued)

(52) U.S. Cl.
CPC ................ *B08B 3/02* (2013.01); *B08B 3/026* (2013.01); *B08B 3/14* (2013.01); *B08B 5/04* (2013.01);
(Continued)

(58) Field of Classification Search
CPC .. B08B 3/02; B08B 3/026; B08B 5/04; B08B 2203/0229; B08B 3/08; B08B 3/006; B08B 3/14; B09B 3/066
(Continued)

(56) References Cited

U.S. PATENT DOCUMENTS 3,928,060 A * 12/1975 Smith ..................... C04B 14/40
106/466
4,693,755 A * 9/1987 Erzinger ............... B09B 3/0066
106/197.01

(Continued)

FOREIGN PATENT DOCUMENTS

FR 2690093 A1 10/1993
FR 2741287 A1 5/1997
(Continued)

OTHER PUBLICATIONS

International Search Report from parent PCT application PCT/FR2014/050543 mailed on Jul. 16, 2014, 4 pages.
(Continued)

*Primary Examiner* — Duy Deo
*Assistant Examiner* — Maki Angadi
(74) *Attorney, Agent, or Firm* — Tech Valley Patent, LLC; John Pietrangelo

(57) ABSTRACT

The present invention relates to a device for decontaminating surfaces such as a wall, a floor, or a ceiling of a building, or the like, having one or more toxic products, such as, asbestos, lead (Pb), PCBs (polychlorinated biphenyls), polycyclic aromatic hydrocarbons (PAHs), or radioactive prod-
(Continued)

ucts. The device includes at least one hydroblasting head fed by a high pressure unit and connected to a vacuum source comprising a low pressure source connected to a cyclone head mounted on a container which collects water containing toxic products and residues of the support. A filtration system having a filtering press is provided. The filtering press is fed with water containing toxic products collected in the container and whose output feeds a buffer tank wherein the water from the filtration comprises particles less than or equal to 5 μm. Another objective of the invention concerns a method for decontaminating surfaces.

19 Claims, 12 Drawing Sheets

(51) Int. Cl.
  *B09B 3/00* (2006.01)
  *B08B 3/14* (2006.01)
  *B08B 5/04* (2006.01)
(52) U.S. Cl.
  CPC .... *B09B 3/0066* (2013.01); *B08B 2203/0229* (2013.01)
(58) Field of Classification Search
  USPC .......................................... 134/10, 22.12, 46
  See application file for complete search history.

(56) References Cited

U.S. PATENT DOCUMENTS

| | | | | | |
|---|---|---|---|---|---|
| 4,872,920 | A | * | 10/1989 | Flynn | A47L 5/14 134/21 |
| 4,897,121 | A | * | 1/1990 | Sasaki | B08B 15/026 134/22.18 |
| 2012/0048791 | A1 | * | 3/2012 | Tongiani | B01D 25/164 210/231 |
| 2013/0020244 | A1 | * | 1/2013 | Schulte | B01D 25/19 210/228 |
| 2013/0280991 | A1 | * | 10/2013 | Loubeyre | B24C 5/02 451/90 |

FOREIGN PATENT DOCUMENTS

| | | |
|---|---|---|
| FR | 2746037 A1 | 9/1997 |
| FR | 2815276 A1 | 4/2002 |
| FR | 2853846 A1 | 10/2004 |
| FR | 2875720 A1 | 3/2006 |
| WO | 8904729 A1 | 6/1989 |
| WO | 9104805 A1 | 4/1991 |
| WO | 2010140952 A1 | 12/2010 |

OTHER PUBLICATIONS

Written Opinion from parent PCT application PCT/FR2014/050543 mailed on Jul. 16, 2014, 8 pages.

* cited by examiner

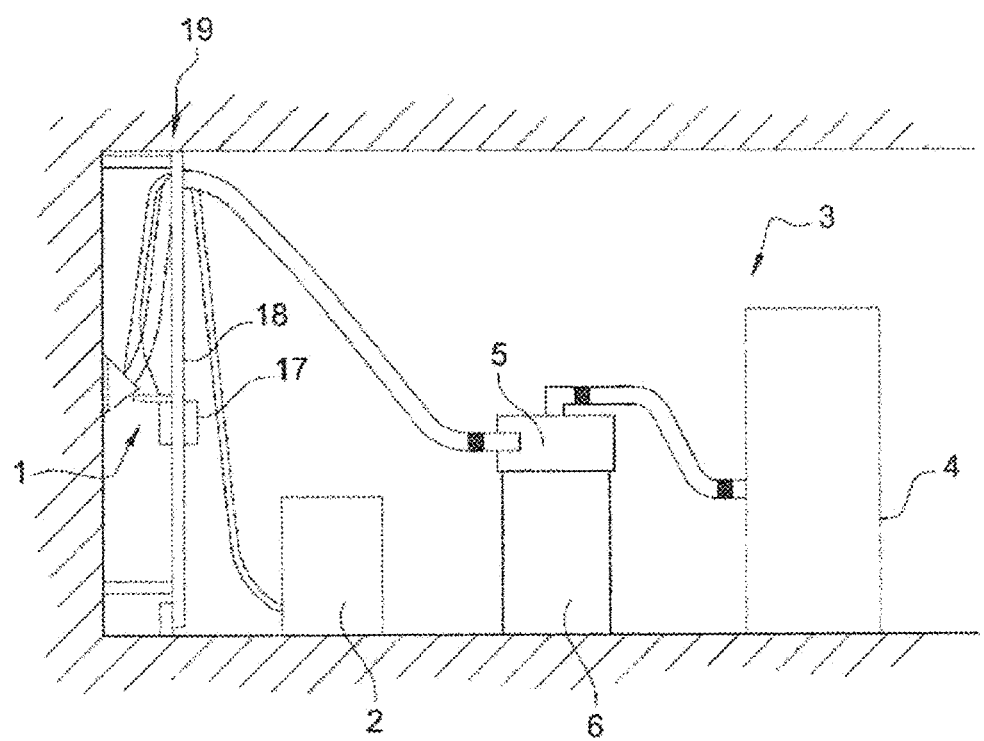
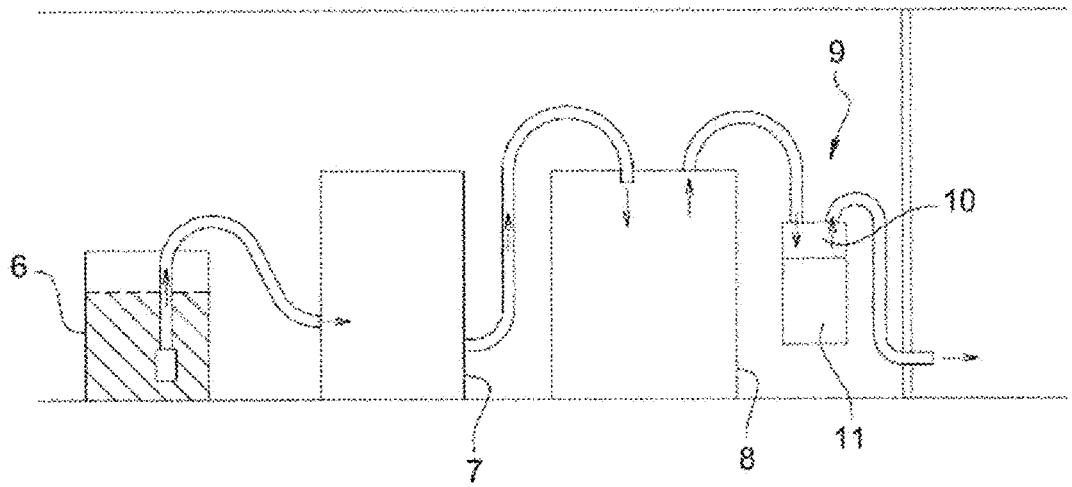
Fig. 1

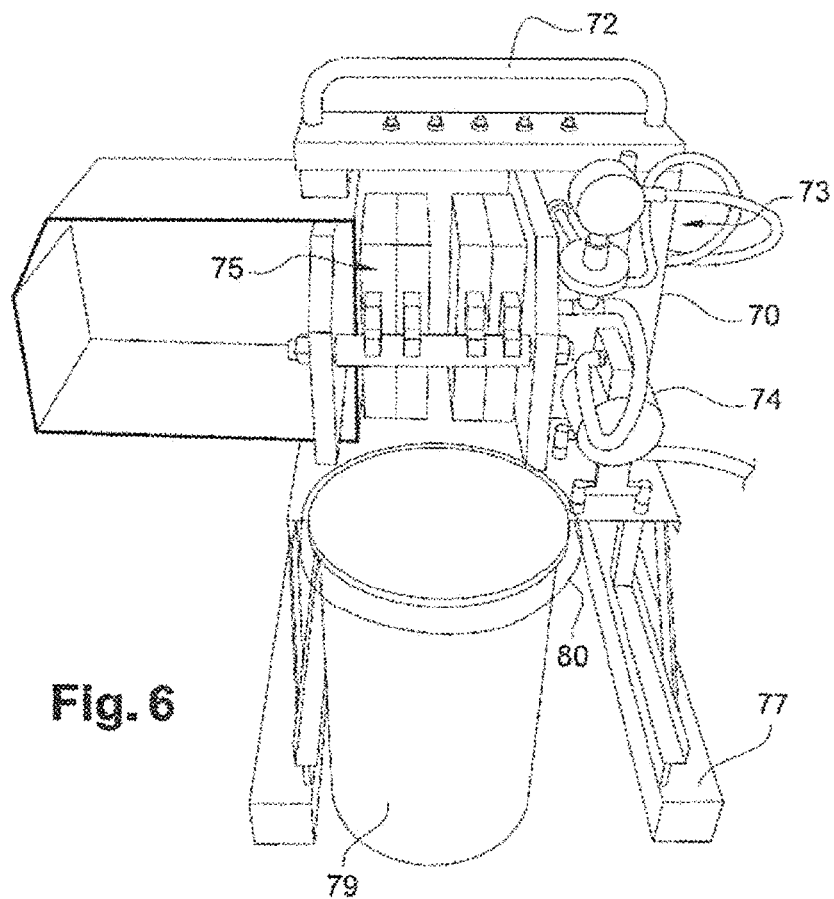
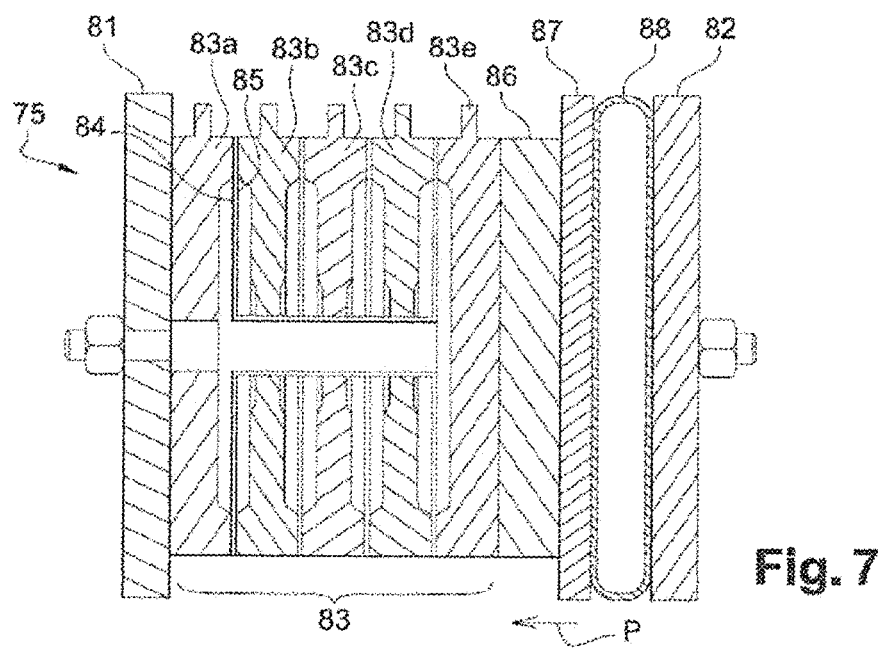

DEVICE AND METHOD FOR DECONTAMINATING SURFACES COMPRISING ONE OR A PLURALITY OF TOXIC PRODUCTS

CROSS-REFERENCE TO RELATED APPLICATIONS

This application is a §371 filing of PCT application PCT/FR2014/050543 filed on Mar. 10, 2014, which claims priority from French application FR 1352127 filed on Mar. 8, 2013 and from French application FR 1359638 filed on Oct. 4, 2013. The disclosures of these applications are included by reference herein in their entirety.

BACKGROUND

Technical Field

The present invention relates to a device for decontaminating surfaces by hydroblasting enabling a removal of toxic products, and more particularly asbestos and lead, with almost no emission of contaminated particles in the atmosphere in order to ensure worker safety, reduce the onerousness of workers and protect the direct environment, that is to say the decontamination area demarcating the site, and the indirect environment, that is to say, the environment around the decontamination site.

Prior Art

Asbestos has been known for over two thousand years and has long been used in a number of materials and products, due to its acoustic and thermal insulation properties, resistance to heat and fire, chemical inertness, mechanical strength and rot-proof properties. However, the physicochemical characteristics of asbestos, in combination with an ability to splinter into split microscopic fibres to reach the pulmonary alveoli, and even migrate to the pleura, result in significant inhalation of asbestos fibres becoming hazardous. According to the regulation, a worker must not inhale more than 0.1 fibres per $cm^3$ in an hour. Pathologies, mainly lung cancer, can manifest themselves for more than fifty years after the first exposure to asbestos fibres. The adverse effects on human health have therefore led to a control and then a gradual reduction of its use, followed by total prohibition since 1 Jan. 1997, by decree no. 96-1133 of 24 Dec. 1996 on the prohibition of asbestos, adopted under the Labour Code and the Consumer Code.

Currently, asbestos removal operations are carried out in multiple restrictive steps, as they must meet safety standards both for the worker and the environment. The worker must be provided with overalls and a respiratory system in order to avoid inhaling loose asbestos dust, which can be extremely toxic. His work must be performed in an enclosed area with access to said zone through an airlock, divided into several compartments, including two shower areas. This enclosed area must have a lower air pressure than the outside air so that in case of leakage, it is the outside air that enters the enclosed area, and not vice versa. This enclosed area is formed using two polyane films that the protect surfaces that are not subject to asbestos removal. A proper ventilation system must also be provided.

However, it is common that the overalls and/or the respiratory system become inoperative during the site work, due to a tear in the overalls or a malfunction of the respiratory system, for example, such that the workers breathe more than 0.1 fibres per $cm^3$ for an hour exposing themselves to fatal diseases. Moreover, despite all the precautions taken during the confinement, since the said confinement requires a long time for setting up, and the mandatory checks that significantly increase the cost of asbestos removal sites, asbestos fibres can escape from the confinement area thereby endangering persons outside the site, who are likely to unknowingly breathe asbestos fibres.

The asbestos thus removed from its support can undergo treatment that renders it inert, that is to say, changes it to make it non-toxic to humans. This treatment can consist of vitrification, as described in patents FR 2 853 846 and FR 2 690 093, where the asbestos waste is incorporated in a special furnace to reach very high temperatures. The waste may be packed beforehand, for example by prior bagging, as described in patent FR 2 746 037.

However, it is during the removal of asbestos from its support that the inhalation risks are the greatest. In this regard, it is common to use scrapers and/or sanders to release the asbestos from its support, which produces a large amount of asbestos dust, which may spread in the ambient air. The common methods of asbestos removal require draconian safety conditions without, however, detoxifying the product.

Many alternatives have been found to enable one-step waste removal while rendering the waste inert. This is particularly the case of the U.S. Pat. No. 4,693,755 which describes a method of removing asbestos from its support after the application of a cellulosic polymer-based composition that penetrates and dries the asbestos dust to make it inert.

However, this type of process is no longer used in view of the chemical risks it creates for workers and the environment.

Also known is the patent FR 2 875 720 which describes an asbestos removal method using cold conditions. Following the injection of liquid nitrogen, at a temperature between −40° C. and −196° C., the asbestos freezes into its support and can be removed safely.

Besides the high cost of liquid nitrogen, this process requires an additional step of processing asbestos fibres, which increases the cost of the jobsite.

Also known is the document FR 2 815 276 which describes a device for removal of asbestos from surfaces comprising an apparatus for projection of a high pressure liquid jet, the said pressure being between 1000 and 2000 bars, at a distance of about one meter from the surface to be treated, separate pumping means for drawing the wet residue resulting from the decomposition of the coating fallen on the ground, a filtration system consisting of a filtering press and, optionally, a second filtration system.

All these methods and devices implementing these processes have the disadvantage, in addition to being costly, of producing a very high quantity of asbestos dust which poses a highly significant risk to workers and the environment. In addition, decree no. 2012-639 requires that, from 1 Jul. 2015, the average concentration of asbestos fibres in eight hours of work shall not exceed ten fibres per liter. Therefore, this is one-tenth of the previously authorised rate which placed the limit to 100 fibres per liter. Three classification categories have thus been implemented. At the "first level", the dust cover is lower than the occupational exposure limit value (OELV). At the "second level", the value is greater than or equal to the OELV and less than 60 times the OELV. Finally at the "third level", the value is greater than or equal to 60 times the OELV and less than 250 times the OELV. Thus, immediate consequence of this reduction of the occupational exposure limit value (OELV) will be an increase in cost of the asbestos removal operations using asbestos removal methods of the prior art.

Furthermore, in buildings, there are other products that may constitute a health hazard and that must be safely removed to protect the health of workers particularly during dismantling operations. This is particularly the case of lead, which may cause lead poisoning and is found in many surface coatings such as old paint, PCBs (polychlorinated biphenyls) that are chemicals similar to dioxin found in expansion joints and in some coatings, polycyclic aromatic hydrocarbons (PAHs) that are persistent organic pollutants present in products made from bitumen such as road paving, bituminous adhesives, vapour barriers, sealing materials, walls of treatment plants, walls of water towers, etc., and radioactive products found in cooling towers, containment vessels of reactors of nuclear power plants.

There is therefore a need for a method and a device that can be used for surface treatment comprising one or more toxic products which help remove said products with complete safety for workers and the environment.

SUMMARY OF THE INVENTION

One of the objectives of the invention is therefore to overcome these disadvantages by providing a device for the decontamination of surfaces with one or more toxic products with a simple and inexpensive design, ensuring the removal of said toxic products such as asbestos or lead for example with almost zero particulate emissions into the atmosphere, facilitating the re-treatment of toxic particles, reducing onerousness for workers and increasing their efficiency.

To this end and in accordance with the invention, a device is proposed for decontaminating surfaces such as a wall, a floor or a ceiling of a building or the like, comprising one or more toxic products such as asbestos, lead (Pb), PCBs (polychlorinated biphenyls), polycyclic aromatic hydrocarbons (PAHs) or radioactive products, present in many products with multiple applications such as coating for floors and ceilings, wall coverings (paint, insulation, etc.), road paving, bituminous adhesives, vapour barriers, sealing materials, the walls of the treatment plants, walls of water towers, cooling towers of nuclear power plants, containment vessels of nuclear power plants reactors or the like; the said device is characterised in that it comprises at least one hydroblasting head fed by a high pressure unit and connected to a vacuum source comprising a low pressure source connected to a cyclone head mounted on a container which collects water containing toxic products and residues of the, a first filtration system consisting of a filtering press whose input is fed with water containing toxic products collected in said container and whose output feeds a buffer tank wherein the water from the first filtration comprises particles less than or equal to 5 μm.

Preferably, the device also comprises a second filtration system consisting of a pump provided with at least one filter whose input is fed by water from the buffer tank so that the filtered water contains particles smaller than 1 μm.

Furthermore, the high pressure unit feeding the hydroblasting head delivers a pressure between 300 and 7000 bars with a water flow rate between 4 and 200 L/min.

In addition, the hydroblasting head is mounted on a movable trolley capable of moving along a crossarm of a frame, the said crossarm being adapted to move along the side-members of said frame.

The said frame includes means for fixing the assembly on a wall or a ceiling or the like.

According to an embodiment, the said frame is mounted on a chassis with wheels.

The movable trolley can be safely remote-controlled using a remote control.

The filtering press consists of at least one chassis provided with two wheels and a handle bar to facilitate its transport, an air compressor attached to the chassis, a circulation pump driven by the compressed air produced by the air compressor, and a filtration and pressing unit.

The said chassis is mounted on a substantially U-shaped trolley which comprises four multidirectional wheels with brakes.

The said filtration and pressing unit comprises an upper plate and an end plate that are connected by at least one connecting rod with the interposition of a set of filtration plates, at least one filtration chamber extending between the filtration plates, a filter cloth extending into the said filter chamber, a clamping device adapted to (i) bring the filter plates to an operating position wherein the filtration chambers are pressed against each other tightly and (ii) release the filter plates in an open position wherein the filter chambers can be opened to release the baled toxic products and support residue, a removable spacer plate, a pressure plate and a clamping device in the form of a pneumatic cushion that is powered by the compressor.

Moreover, the pneumatic cushion is supplied with air compressed by the air compressor through a first pneumatic circuit comprising a pneumatic control valve and the said air compressor comprises two compressed air outlets, the air outlet supplying compressed air to the first pneumatic circuit and ultimately the pneumatic cushion and the second compressed air outlet supplying compressed air to a second pneumatic circuit that feeds the circulation pump for driving it, the pneumatic control valve being controlled by the pressure of the second pneumatic circuit.

Incidentally, the high pressure unit feeding the hydroblasting head is mounted on a mobile chassis for ease of transport.

Preferably, the device according to the invention comprises at least one membrane filter for treating water containing toxic products and support residue collected in the container, the said membrane filter providing a first outlet for water more contaminated with materials that can be treated by the first filtration system and a second filtered water outlet which can be connected to the sewage system and/or the high pressure unit.

Another objective of the invention relates to a method for decontaminating surfaces such as a wall, a floor or a ceiling of a building or the like, comprising one or more toxic products such as asbestos, lead (Pb), PCBs (polychlorinated biphenyls), polycyclic aromatic hydrocarbons (PAHs) or radioactive products, present in many products with multiple applications such as coating for floors and ceilings, wall coverings (paint, insulation, etc.), road paving, bituminous adhesives, vapour barriers, sealing materials, the walls of the treatment plants, walls of water towers, cooling towers of nuclear power plants, containment vessels of nuclear power plants reactors or the like; the said method is characterised in that it comprises at least the following steps:

a) removal of a layer consisting of toxic products on a support by means of at least one hydroblasting head projecting, in a given closed volume, a high pressure jet, b) suction of the water mixture, toxic products and support residue, inside the closed volume of the hydroblasting head, and storage in a container, c) transfer of the water mixture, toxic products and support residue stored in the container to a filtering press to form wet bales of toxic products and support residue; the discharge water containing particles of toxic products less than or equal 5 μm is transported to a buffer tank in which it is stored.

Advantageously, the method according to the invention comprises a step of passing the water from the buffer tank through at least one filter such that the filtered water contains particles smaller than or equal to 1 μm.

Incidentally, the method also comprises a step of introducing a filler into the container prior to the transfer of the water mixture, toxic products and support residue stored in the container to the filtering press.

The said filler consists of a hydraulic binder and/or an inorganic and/or organic and/or chemical filler.

Preferably, the method comprises a step of pre-treating the water mixture, toxic products and support residue through at least one membrane filter, the said membrane filter providing a first outlet for water more contaminated with materials that can be then treated by the first filtration system and a second filtered water outlet which can be connected to the sewage system and/or the high pressure unit.

BRIEF DESCRIPTION OF THE FIGURES

Other advantages and characteristics will become clearer from the following description of a single embodiment, given by way of a non-exhaustive example, of the device and method of decontamination according to the invention, with reference to the accompanying drawings of which:

FIG. 1 is a schematic side view of the asbestos removal device according to the invention, FIG. 6 is a perspective view of the filtering press of the decontamination device according to the invention, in the position for discharge of bales of toxic products and support residue, FIG. 7 is a schematic sectional view of the filtering press of the decontamination device according to the invention.

DETAILED DESCRIPTION OF THE INVENTION

In the following description of the device according to the invention, the numerical references correspond to the related description in all cases. The section views are not necessarily drawn to scale. Furthermore, the device according to the invention is particularly intended for asbestos removal; however, it is clear that the device according to the invention can find numerous applications in the treatment of surfaces containing toxic products without departing from the scope of the invention. The said toxic products may consist, but are not limited to, in particular lead (Pb), PCBs (polychlorinated biphenyls), polycyclic aromatic hydrocarbons (PAHs) or radioactive products that are present in many products with multiple applications such as coating for floors and ceilings, wall coverings (paint, insulation, etc.), road paving, bituminous adhesives, vapour barriers, sealing materials, walls of the treatment plants, walls of water towers, cooling towers of nuclear power plants, containment vessels of nuclear power plant reactors or the like, etc.

Figure 2:
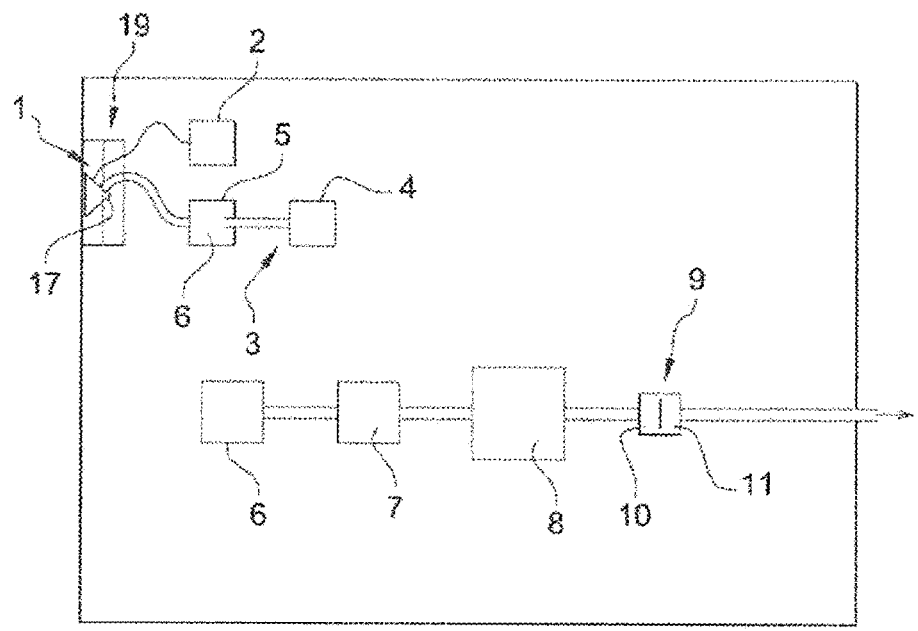
FIG. 2 is a schematic top view of the decontamination device according to the invention.
Figure 3:
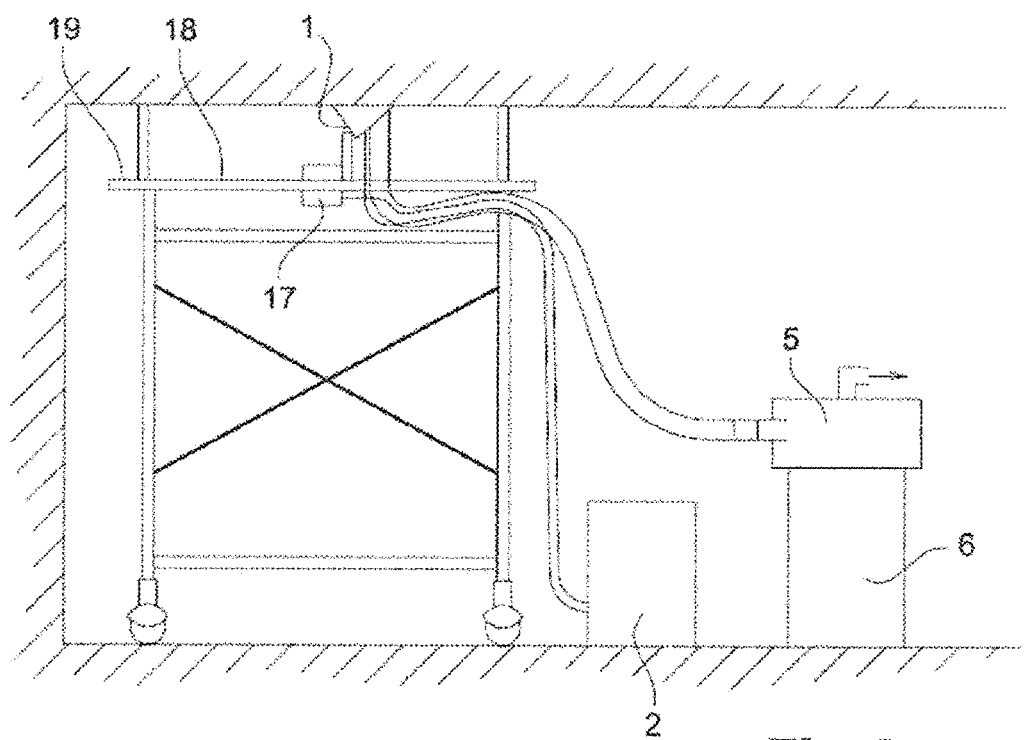
FIG. 3 is a schematic side view of the decontamination device according to the invention, mounted on a ceiling.

With reference to FIGS. 1 and 2, the asbestos removal device according to the invention comprises at least one hydroblasting head (1) fed by a high pressure unit (2) and connected to a vacuum source (3) consisting of a suction unit (4) and a cyclone head (5) mounted on a barrel (6) which collects water containing asbestos particles, a first filtration system (7) consisting of a filtering press whose inlet is fed with water containing asbestos particles collected in the said barrel (6) and whose outlet feeds a buffer tank (8) in which the water from the first filtration comprises asbestos particles less than or equal to 5 μm, and optionally, a second filtration system (9) comprising a pump (10) equipped with a filter (11) whose inlet is fed by water from the buffer tank (8) such that, upon discharge from the filter, the filtered water contains asbestos particles less than 1 μm.

It will be observed that in this particular embodiment, a cylindrical barrel (6) is used; however, it is clear that the barrel (6) may be substituted by any suitable fixed or mobile container without departing from the scope of the invention.

The said high pressure unit (2) feeding the hydroblasting head (1) delivers a pressure between 300 and 7000 bars with a water flow rate between 4 and 200 L/min. The said high pressure unit may be a unit marketed by the company RIVARD under the reference AQUAJET or any other high pressure unit well known to the person skilled in the art.

It is clear that the high pressure unit can be of any kind well known to those skilled in the art without departing from the scope of the invention.

Figure 4:
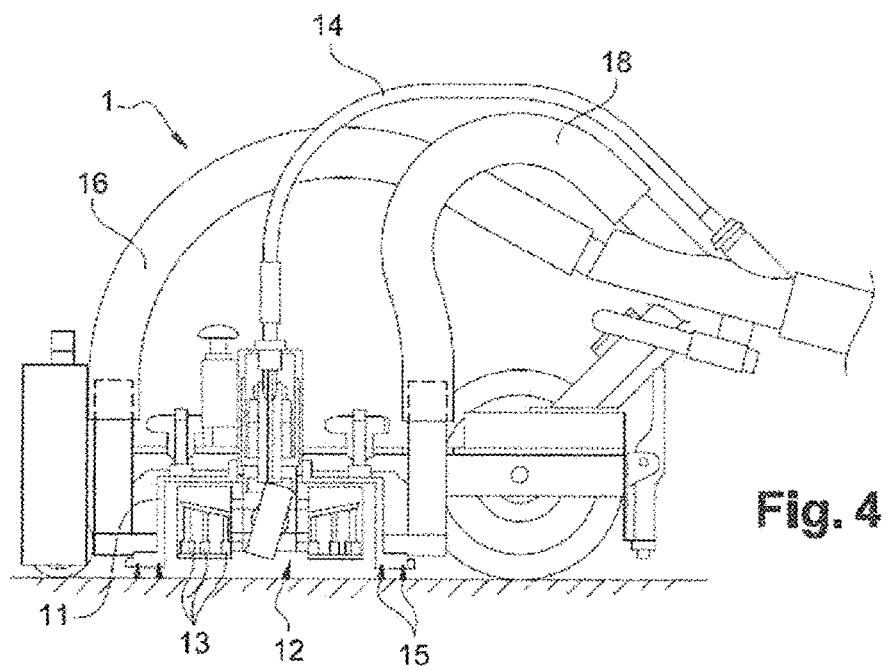
FIG. 4 is a sectional view of the hydroblasting head of the decontamination device on the ground according to the invention.

With reference to FIG. 4, the hydroblasting head (1) comprises a substantially cylindrical housing (11) that receives an extension of a rotating nozzle (12) provided with holes (13), the said nozzle being fed by high pressure water through a flexible pipe (14) so as to form jets at the outlet of the holes (13). Note that the orientation of the holes (13) ensures the rotation of the rotating nozzle (12). The lower edge of the housing (11) comprises a brush (15) ensuring sealing when the hydroblasting head (1) is pressed against the surface to be treated. The said hydroblasting head (1) also comprises suction pipes (16) connected to the vacuum source (3) shown in FIGS. 1 and 2 and opening into the housing (11). The said hydroblasting head (1) may, for example, be a head marketed by the company HAMMELMANN under the reference AQUABLAST-PLUS for example, or any other hydroblasting head well known to those skilled in the art.

It is clear that the number of holes (13) and their orientation depend in particular on the pressure applied by the high pressure unit (2) and the nature of the surface to be treated and the skilled person shall have no difficulty in determining the number of holes and their orientations. Moreover, it is clear that the hydroblasting head (1) may be of any kind known to those skilled in the art without departing from the scope of the invention.

Advantageously, with reference to FIGS. 1 and 2, the hydroblasting head (1) is mounted on a movable trolley (17) capable of moving along a crossarm (18) of a frame (19), the said crossarm (17) being adapted to move along the side-members (20) of the said frame. Preferably, the said frame (19) includes means for fixing the assembly on a wall or a ceiling or the like.

Furthermore, to improve the safety of workers, the mobile trolley (17) on which the hydroblasting head (1) is mounted is advantageously remote-controlled by a remote control not shown in the figures.

The said frame (19) and the mobile trolley may be, for example, part of the system marketed by the company CONJET under the reference NALTA and described in international patent application WO2010140952. It is clear that the frame (19) may consists of any equivalent system well known to those skilled in the art without departing from the scope of the invention.

It will be noted that said frame (19) may be mounted on a scaffold such that the frame is clamped between the floor and ceiling; the scaffold shall comprise wheels equipped with brakes.

Figure 5:
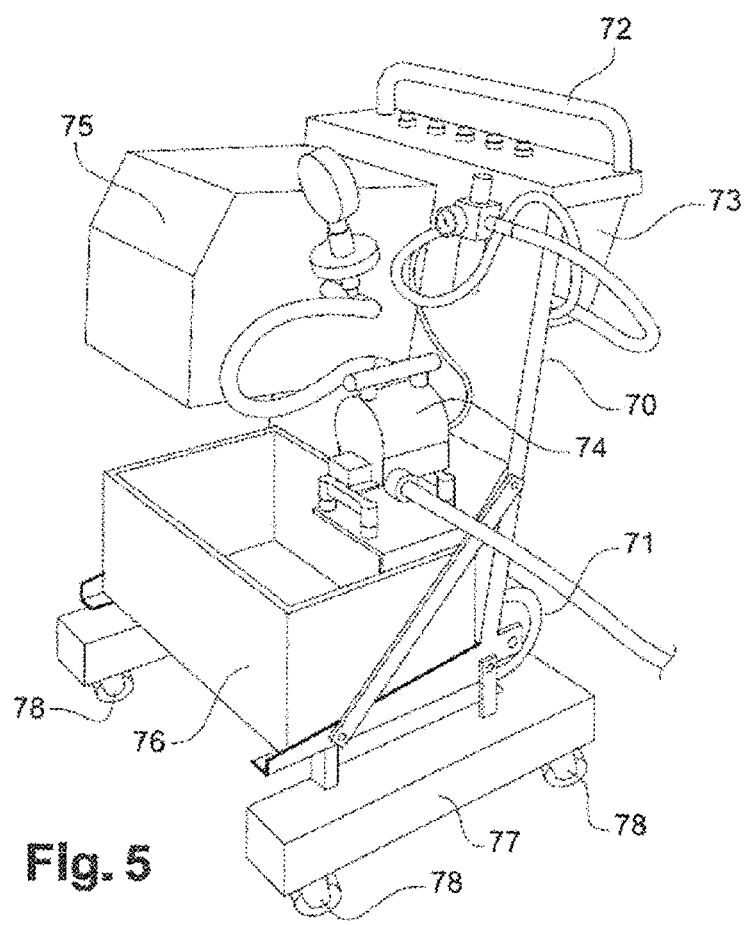
FIG. 5 is a perspective view of the filtering press of the decontamination device according to the invention.

With reference to FIG. 5, the filtering press constituting the first filtration means (7) consists of at least one chassis (70) provided with two wheels and a handle bar (72) to facilitate its transport, an air compressor (73) attached to the chassis (72), a circulation pump (74) driven by the compressed air produced by the air compressor (72), and a filtration and pressing unit (75). A recovery tank (76) is positioned under the said filtration and pressing unit (75). This tank contains water that may flow from the filtration and pressing unit (75); the said recovery tank (76) will rest on the lower side-members of the chassis (70). The said chassis (70) is mounted on a substantially U-shaped trolley (77) which comprises four multidirectional wheels (78) with brakes. With reference to FIG. 6, the U-shape of the trolley (77) allows, after removal of the recovery tank (76), the positioning of a barrel (79) provided with a plastic bag (80) which receives compressed bales of asbestos fibres and support residue from the filtration and pressing unit as will be described later. Note that these compressed bales of asbestos fibres and support residue are wet thereby preventing any emission of asbestos fibres into the environment.

With reference to FIGS. 5 to 7, the said filtration and pressing unit (75) comprises an upper plate (81) and an end plate (82) that are connected by at least one connecting rod, not shown in the figures, with the interposition of a set (83) of filtration plates (83a, 83b, 83c, 83d, 83e), at least one filtration chamber (84) extending between the filtration plates (83a, 83b, 83c, 83d, 83e), a filter cloth (85) extending into the said filter chamber (84). The said unit further comprises a clamping device adapted to (i) bring the filter plates (83a, 83b, 83c, 83d, 83e) to an operating position wherein the filtration chambers (84) are pressed against each other tightly and (ii) release the filter plates (83a, 83b, 83c, 83d, 83e) in an open position wherein the filter chambers (84) can be opened to release the bales of toxic products and support residue, a removable spacer plate (86), a pressure plate (87) and a clamping device in the form of a pneumatic cushion (88) that is powered by the compressor (73). The said filtering press (7) may, for example, be a press marketed under the references SFP 3L or SFP 8L by the company GÖLZ or a filtering press described in US patent application US2013020244 or any other equivalent filtering press.

It is clear that the filtering press may be of any other kind well known to those skilled in the art, such as the filtering press described in the European patent EP 2 396 098 for example, without departing from the scope of the invention.

Figure 8:
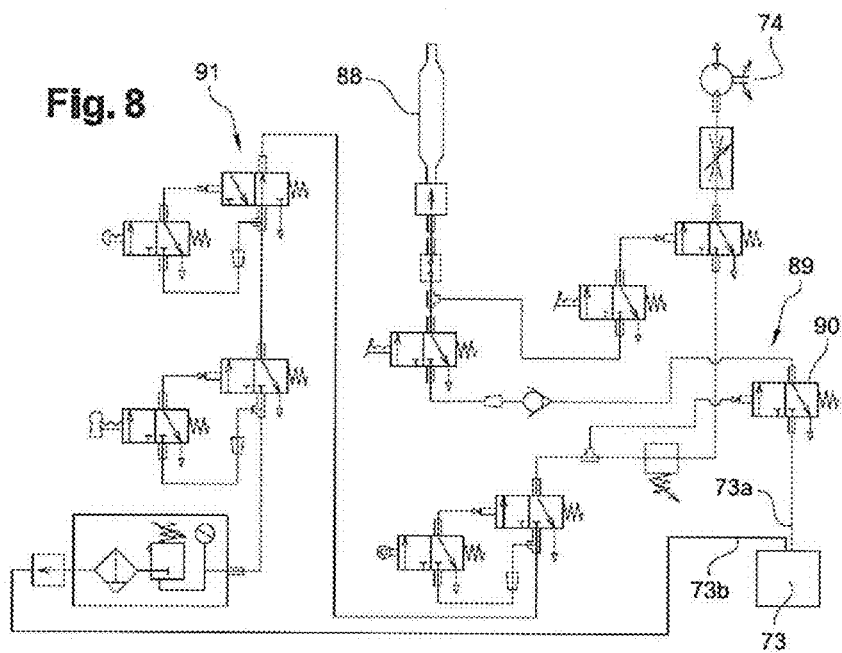
FIG. 8 is a schematic representation of the pneumatic circuit feeding the filtering press of the decontamination device according to the invention.

With reference to FIG. 8, the pneumatic cushion (88) is supplied with compressed air by the air compressor (73) through a first pneumatic circuit (89) comprising a pneumatic control valve (90). The said air compressor (73) comprises two compressed air outlets (73a) and (73b); the air outlet (73a) supplies compressed air to the first pneumatic circuit (89) and ultimately the pneumatic cushion (88) and the second compressed air outlet (73b) supplies compressed air to a second pneumatic circuit (91) which feeds the circulation pump (74) for driving it. The pneumatic control valve (90) is controlled by the pressure of the second pneumatic circuit (91). Such an assembly helps to provide a greater flow to the circulation pump (74) and to ensure simultaneous inflation of the pneumatic cushion (88).

Figure 9:
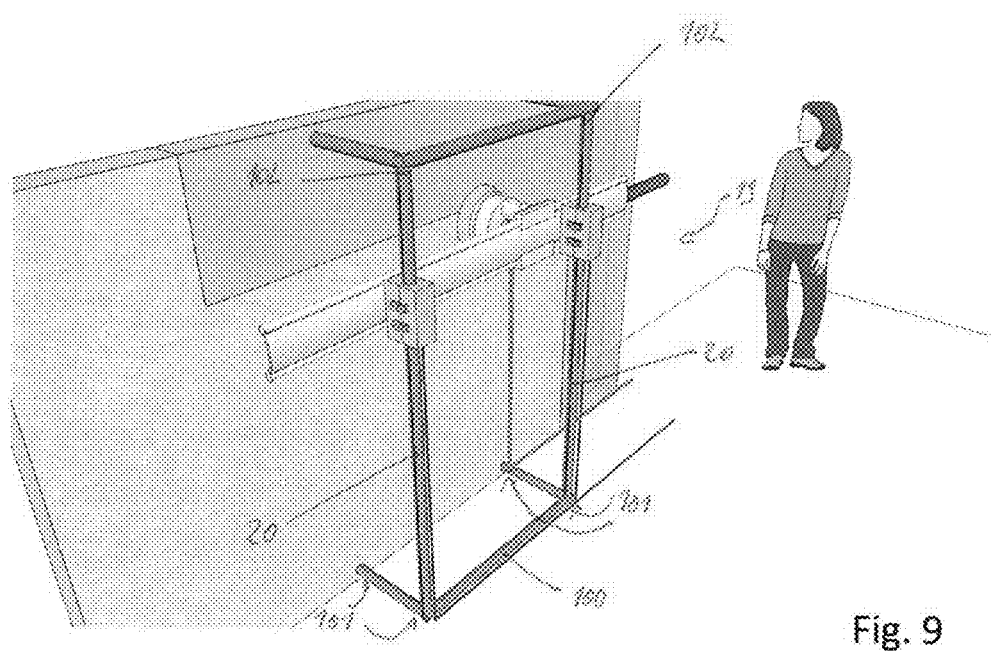
FIG. 9 is a perspective view of the frame carrying the hydroblasting head on a wall of the decontamination device according to the invention.

According to an alternative embodiment, with reference to FIG. 9, the said frame (19) is mounted on a chassis (100) having wheels (101) or the like provided with brakes. Furthermore, the side-members (20) comprise at their upper end mechanical jacks (102) consisting of an endless screw in order to vary their length. In this way, it is possible to block the frame (19) along a wall by positioning said frame (19) against the wall and then pressing the upper end of said frame (19) against the ceiling by operating the jacks, the wheel brakes (101) being blocked beforehand.

It is clear that the mechanical jacks (102) may be substituted by any other jack well known to those skilled in the art such as a pneumatic, hydraulic, electrical or similar jack without departing from the scope of the invention.

Figure 10:
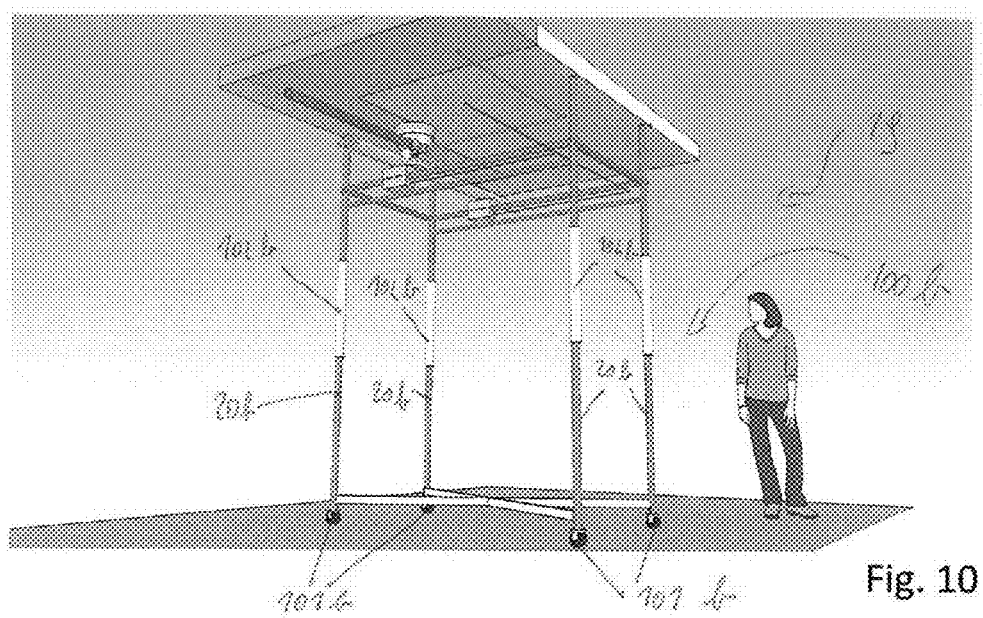
FIG. 10 is a perspective view of an alternative embodiment of the frame carrying the hydroblasting head on a ceiling of the decontamination device according to the invention.

According to an alternative embodiment, with reference to FIG. 10, the said frame (19b) is mounted on a chassis (100*b*) comprising wheels (101*b*) or the like equipped with brakes. Furthermore, the side-members (20*b*) comprise jacks (102*b*) for varying their length.

In this way, it is possible to block the frame (19*b*) on the ceiling, the wheel brakes (101) being blocked beforehand.

The operation of the device according to the invention with reference to FIGS. 1 and 2 will now be explained.

The frame (19) of the device being previously positioned in line with a wall comprising a wall covering containing asbestos fibres, the hydroblasting head (1) is supplied with pressurised water by the high pressure unit (2) which is activated. Simultaneously, the vacuum source (3) is actuated to ensure a depression in the hydroblasting head (1). The latter removes the wall covering containing asbestos fibres and the mixture of water, asbestos fibres and wall support residue is vacuumed into the barrel (6).

When the barrel (6) is filled, the cyclone head (5) is removed and placed on an empty barrel (6). The barrel (6) filled with water, asbestos fibres and wall support residue is then placed on the second part of the device. A conduit (200) feeding the filtering press (7) is positioned in the barrel (6) and the mixture of water, asbestos fibres and wall support residues mount is drawn into said filtering press (7) using its circulation pump (74). The said filtering press (7) firstly provides bales of asbestos fibres and wall support residue through its filter chambers and secondly, water containing asbestos particles less than or equal to 5 µm. The bales of asbestos fibres and wall support residue are evacuated from the filter chambers of the filtering press by opening them causing the said bales to fall, with reference to FIG. 6, in the plastic bag (80) extending into the barrel (79) positioned below the filtration and pressing unit (75). When the plastic bag (80) is full, it is sealed and evacuated to an appropriate treatment centre for asbestos fibres. The water containing asbestos particles less than or equal to 5 µm is then deposited into the buffer tank (8) and then treated with a second filtration system consisting of a pump (10) equipped with one or more filter(s) (11) such that the filtered water contains asbestos particles less than 1 µm. This water can then be released into the domestic water system or be reintroduced into the high pressure unit (2) to supply the hydroblasting head. Note that the structure and the number of filters (11) depend mainly on the nature of the treated support and its friability.

According to an alternative embodiment, a filler is introduced in the barrel (6) filled with water, asbestos fibres and wall support residue before being placed on the second part of the device. This filler may consist of a hydraulic binder, in a proportion of 20 to 200 g of binder per 100 liters, such as portland cement, lime or any other hydraulic binder or any other well known to those skilled in the art, and/or a mineral filler such as sand and/or chalk and/or talc and/or carbon black and/or synthetic silica (thixotropic agent) and/or mica and/or kaolin and/or barium sulphate and/or barium ferrite, etc. and/or an organic filler such as wood flour or fruit peel and/or cellulose pulp, etc. and/or a chemical filler. In this way, the said filler provides a binder to the bales of asbestos fibres and wall support residue produced by the filtering press (7) ensuring greater stability of the bales over time and thus facilitating further treatment.

Incidentally, the high pressure unit (2) and/or the vacuum source (3) and/or the filtering press (7) and/or the buffer tank (8) can be mounted on a mobile chassis to facilitate their transport.

Figure 11:
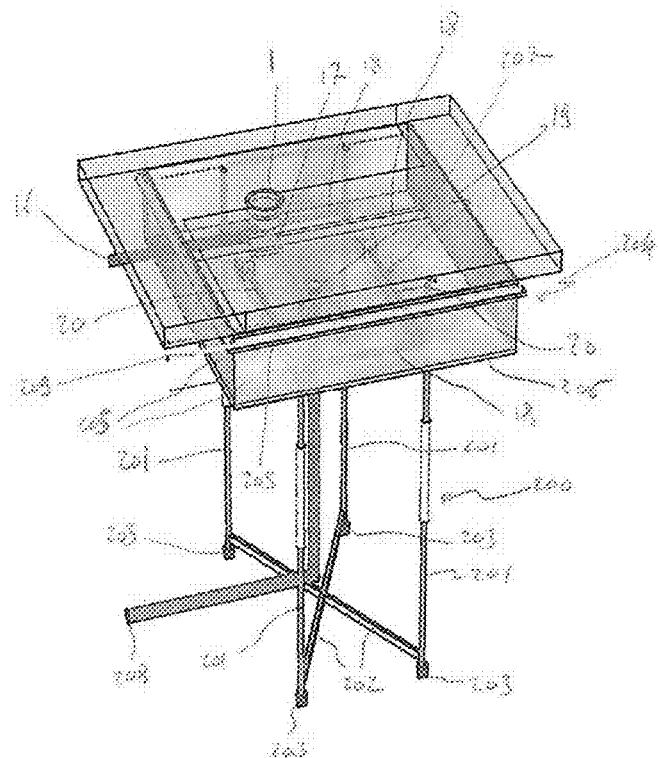
FIG. 11 is a perspective view of an alternative embodiment of a frame carrying the hydroblasting head of the decontamination device for treating a ceiling.

According to an alternative embodiment, with reference to FIG. 11, in order to enable the decontamination of a ceiling or a sloped ceiling for example, the said frame (19) carrying the hydroblasting head (1) consists of side-members (20) and crossarms (18), the said hydroblasting (head 1) being mounted on a mobile trolley (17) adapted to move along a crossarm (18). The said frame (19) is mounted on a chassis (200) consisting of four vertical telescopic uprights (201) fixed to the frame (1) near their upper ends and the lower ends of which are connected by cross spacers (202). Incidentally, the lower ends of the vertical telescopic uprights (201) are provided with wheels (203), optionally provided with brakes, in order to enable quick and easy movement of the frame (19) in line with the surface to be treated.

Furthermore, the chassis (200) may advantageously include a recovery tank (204) having sidewalls (205) and a bottom wall (206) such that the said tank (204) is opened at its upper end, the edges of the side walls being supported by the ceiling to be treated. The frame (19) carrying the hydroblasting head (1) extends into the recovery tank (204) one of whose side walls (204) includes a light provided with a lip seal for sealing purposes and through which the suction pipe (16) of the said hydroblasting head extends (1). In this particular embodiment, the recovery tank (204) has a substantially parallelepiped shape; however, it is clear that the said recovery tank (204) may have any shape without departing from the scope of the invention. Furthermore, the bottom wall (206) of the recovery tank comprises a drain hole (207) connected to a second suction pipe (208), the said second suction pipe (208) being, for example, connected to a vacuum source comprising a suction unit and a cyclone head mounted on a barrel. The said recovery tank (204) thus helps recover any drips of water containing toxic products and residue and/or regulate and monitor an emissivity of toxic products which was not initially controlled, in order to then treat them according to the method described above.

To avoid any emission of toxic particles into the atmosphere, the chassis (200) can advantageously comprise an atomiser pipe (209) extending along the periphery of the recovery tank (204), outside the latter, and connected to a pressurised water source in order to produce a fog the droplets of which are able to trap any particles of toxic products escaping from the said tank (204) or generated by the edge of the frame with the contaminated support treated. Note that the chassis (200) may also comprise a second atomiser pipe, not shown in the figures, extending to the periphery of the recovery tank (204) inside thereof, and connected to a pressurised water source. It will be observed that said pressurised water source may consist of the running water network for example or the post-filtration recycling water.

Figure 12:
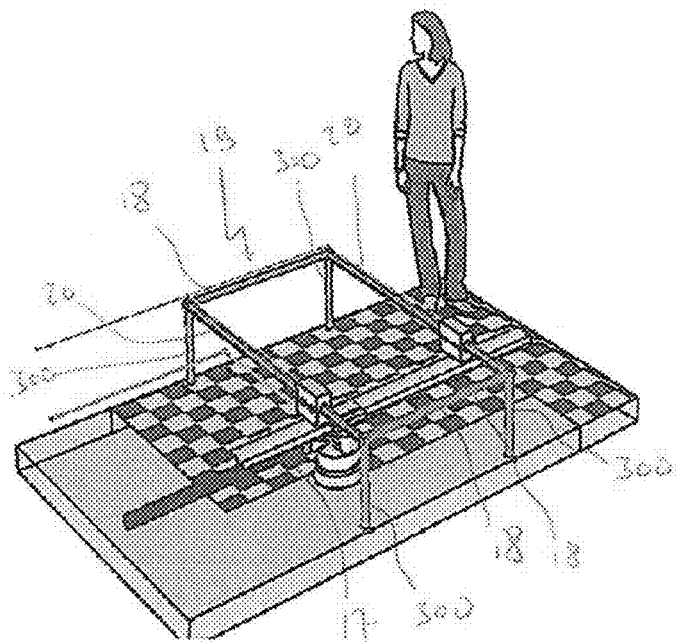
FIG. 12 is a perspective view of a frame carrying the hydroblasting head of the decontamination device for treating a floor.

According to an alternative embodiment, with reference to FIG. 12, for the treatment of a floor, the said frame (19) carrying the hydroblasting head (1) consists of side-members (20) and crossarms (18), the said hydroblasting head (1) being mounted on a mobile trolley (17) adapted to move along a crossarm (20), and four bases attached to the crossarms (18) and side-members (20). The said bases (300) are preferably secured or fastened to the crossarms (18) to allow them to slide.

Figure 13:
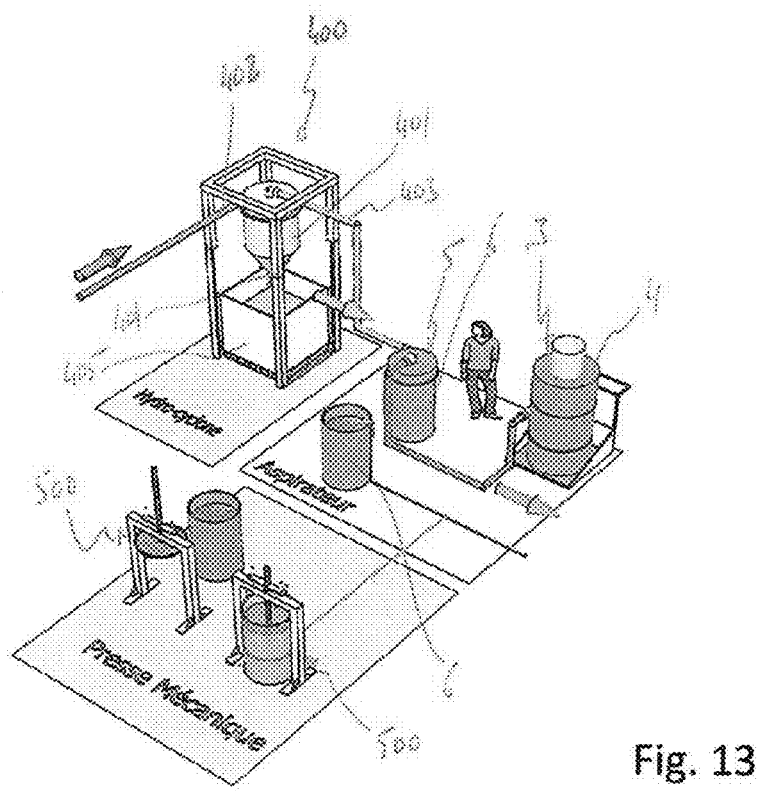
FIG. 13 is a schematic perspective representation of a part of an alternative embodiment of the decontamination device according to the invention.
Figure 14:
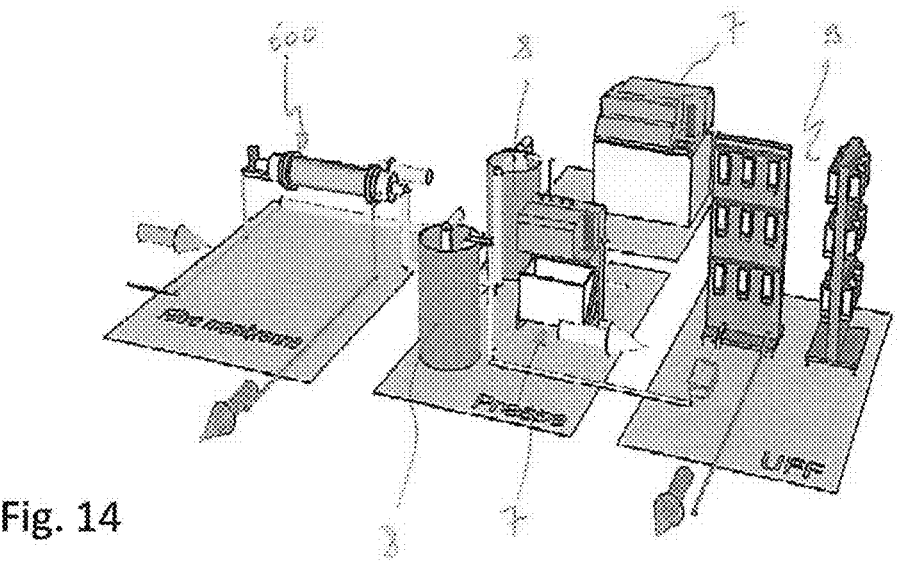
FIG. 14 is a schematic perspective representation of a second part of an alternative embodiment of the decontamination device according to the invention.

According to another embodiment of the device according to the invention, with reference to FIGS. 13 and 14, the latter comprises, in the same manner as indicated above, a hydroblasting head, not shown in FIGS. 13 and 14, fed by a high pressure unit (2) and connected to a vacuum source (3) comprising a suction unit (4) and a cyclone head (5) mounted on a barrel (6) which collects water containing asbestos particles. The said device also comprises buffer tanks (8), a first filtration system (7) consisting of a filtering press and, optionally, a second filtration system (9) such that upon discharge from the filter, the filtered water contains asbestos particles less than 1 μm.

The device differs from that previously described in that it comprises a hydrocyclone filter (400) positioned between the hydroblasting head and the cyclone head (5) in order to conduct a pre-filtering of the water and remove the largest residue from it. The said hydrocyclone filter comprises, in a manner well known per se, a body substantially shaped like a truncated cone (401) having at its upper end an inlet pipe (402) connected to the hydroblasting head, an upper discharge pipe (403) connected to the cyclone head (5) and a lower discharge pipe (404) leading to a discharge tank (405) which receives the toxic products and support residue. The water containing from the hydroblasting head which contains asbestos particles is then introduced into the hydrocyclone filter through the inlet pipe (402) and, under pressure, is transformed into a whirlpool forming a downward primary vortex. The narrowing of the diameter in the lower part of the conical body (401) and the resulting throttle effect produce an upward secondary vortex that rotates in the same direction as the primary downward vortex but that migrates upward in the centre of the conical body (401). With the help of centrifugal force, the particles with a higher specific weight are pressed against the internal wall of the conical body (401) and are transported by a small amount of water to the lower discharge pipe (404) to fall into the discharge tank (405).

Note that the asbestos fibres and support residue falling into the discharge tank (405) are slightly wet thereby preventing any emission of asbestos fibres into the environment. The said asbestos fibres and support residue in the discharge tank (405) are then drained using any suitable means. The said asbestos fibres and support residue contained in the discharge tank (405) may, for example, be pressed in a mechanical press (500) to form residue bales which are then released and processed in an appropriate treatment centre. The water derived from the pressing can be reintroduced into the barrels (6). Furthermore, some materials may not be suspended in the water, despite the action of the water upon removal. Thus, the mechanical press (500), by way of a grid filter action and/or a textile membrane, enables compaction of the said materials. Water derived from this compaction is contaminated and can be treated by the device and the compacted matter not suspended at the bottom of the mechanical press (500) may be packaged according to the regulations concerned.

The device may also comprise a membrane filter (600) well known to those skilled in the art for filtering the water recovered in the barrels (6) after the pressing of asbestos fibres and support residue using the mechanical press (500). Upon discharge, we obtain, on the one hand, water that contains more toxic material and a support quantity that can be diverted towards the treatment chain, and, on the other hand, perfectly filtered water which may, depending the filtration quality, be diverted into the sewage system or in the ultra high pressure unit (2).

Furthermore, in the same manner as above, the device also comprises buffer tanks (8), a first filtration system (7) consisting of a filtering press and, optionally, a second filtration system (9) consisting of multiple filters mounted on a vertical panel for example, and a pump (10) such that upon discharge from the filter, the filtered water contains asbestos particles less than 1 μm.

Figure 15:
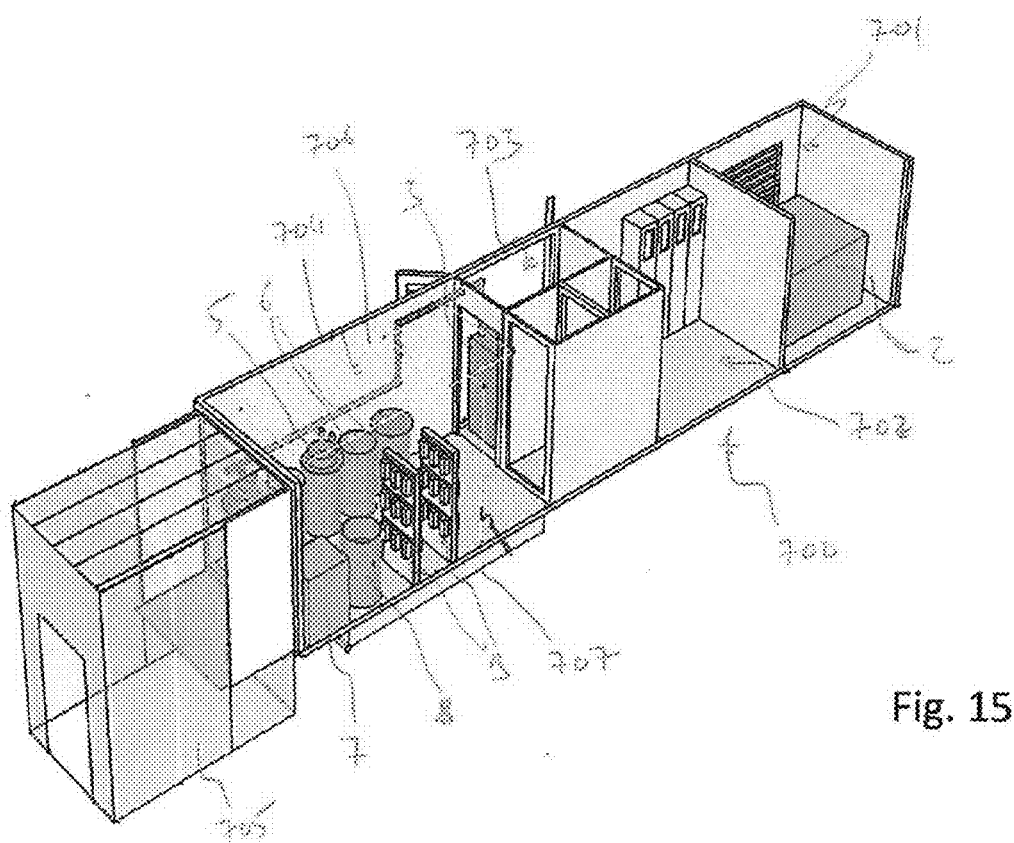
FIG. 15 is a split perspective view of a trailer of a truck in which the decontamination device is installed.

With reference to FIG. 15, the device according to the invention can advantageously be mounted in a truck trailer (700) having multiple compartments (701,702,703,704). From front to rear of the trailer, a first compartment (701) can, for example, accommodate the high-pressure unit (2), a second compartment (702) can be used as a dressing room for the workers, a third compartment (703) can accommodate the vacuum source (3) and a last compartment (704) can accommodate multiple barrels (6) of which one or more carry a cyclone head (5), a first filtration system (7) consisting of a filtering press and, a second filtration system (9) consisting of multiple filters mounted on a vertical panel, for example. The rear end of the trailer (700) may also include a canopy (705) made of polyane or the like forming an airlock. In addition, to avoid the presence of asbestos particles in the last compartment (704), the latter advantageously comprises a water sprinkling pipe network (706) connected to a water source, and the floor of the compartment (704) has a discharge outlet, not shown in the figures. The workers can regularly spray water throughout the compartment (704) to clean it and make it safer by preventing any risk of asbestos particle emissivity. Incidentally, the trailer (700) may include a retention tank (707) extending underneath the chassis of the said trailer (700) to retrieve all the washing water and any leaks in view of its filtration according to the invention, and a recycled water tank. This recycled water may be reintroduced into the ultra high pressure unit (2) or allocated for cleaning, depending on the filtration quality intended.

Figure 16:
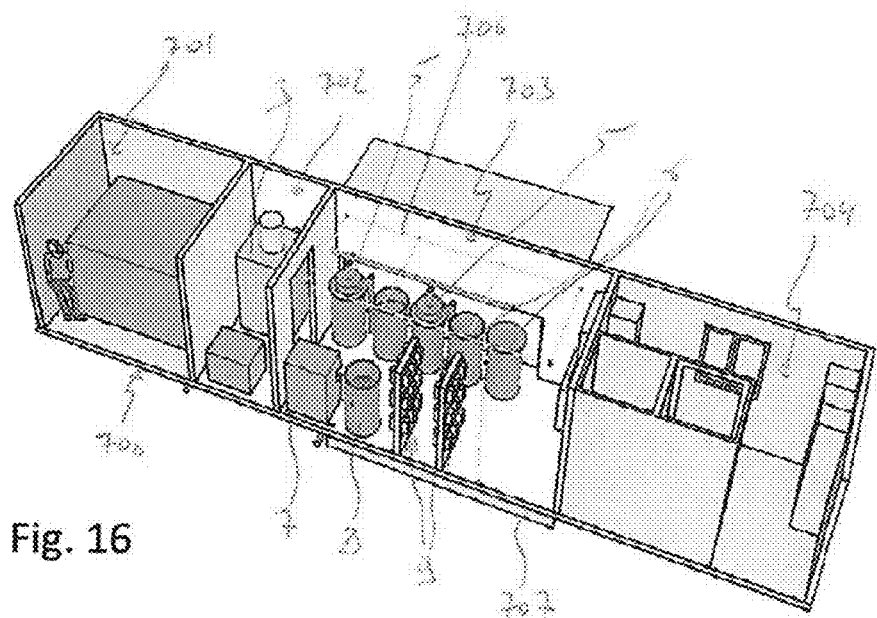
FIG. 16 is a split perspective view of an alternative embodiment of a trailer of a truck in which the decontamination device is installed.

According to an alternative embodiment, with reference to FIG. 16, the trailer comprises from front to rear, a first compartment (701) for accommodating the high-pressure unit (2), a second compartment (702) for accommodating the vacuum source, a third compartment (703) for accommodating multiple barrels (6) of which one or more carry a cyclone head (5), a first filtration system (7) consisting of a filtering press and, a second filtration system (9) consisting of multiple filters mounted on a vertical panel, for example and a last compartment used as a dressing room by the workers. In order to avoid the presence of asbestos particles in the third compartment (703), the latter advantageously comprises a water sprinkling pipe network (706) connected to a water source, and the floor of the compartment (704) has a discharge outlet, not shown in the figures. Incidentally, the trailer (700) may include a retention tank (707) extending underneath the chassis of the said trailer (700) to retrieve all the washing water and any leaks in view of its filtration according to the invention, and a recycled water tank. This recycled water may be reintroduced into the ultra high pressure unit (2) or allocated for cleaning, depending on the filtration quality intended.

Figure 17:
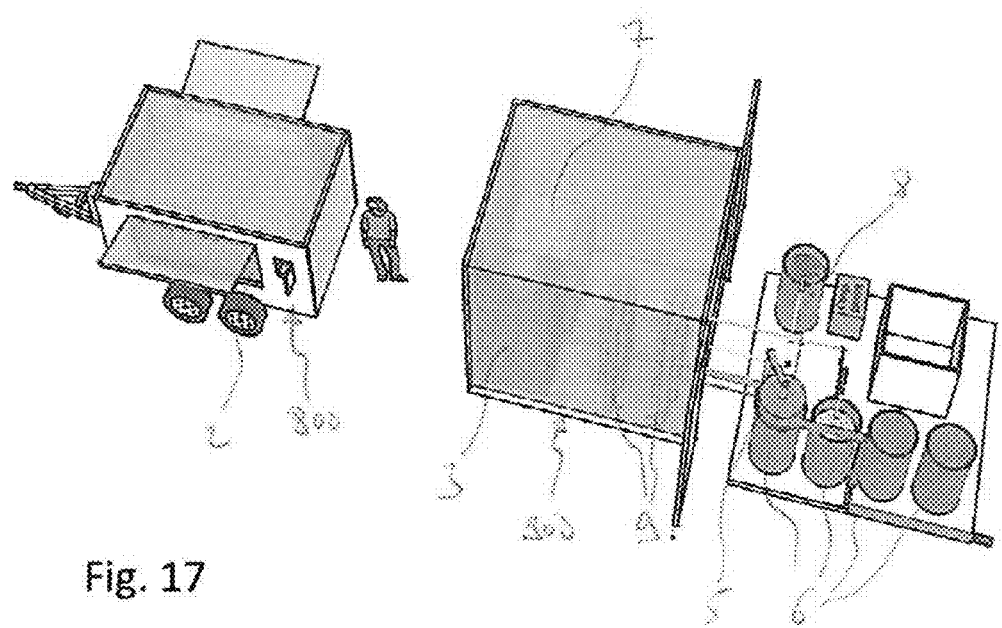
FIG. 17 is a perspective view of an alternative embodiment of the decontamination device according to the invention.

According to another embodiment, with reference to FIG. 17, the device according to the invention may be transported by means of a light trailer (800) which carries the high pressure unit (2) and a small container (900) which carries the vacuum source (3), the first filtration system (7) consisting of a filtering press and the second filter system (9) consisting of multiple filters mounted on a vertical panel, for example, the barrels (6), the cyclone head (5) and the buffers tanks (8) being positioned outside.

Figure 18:
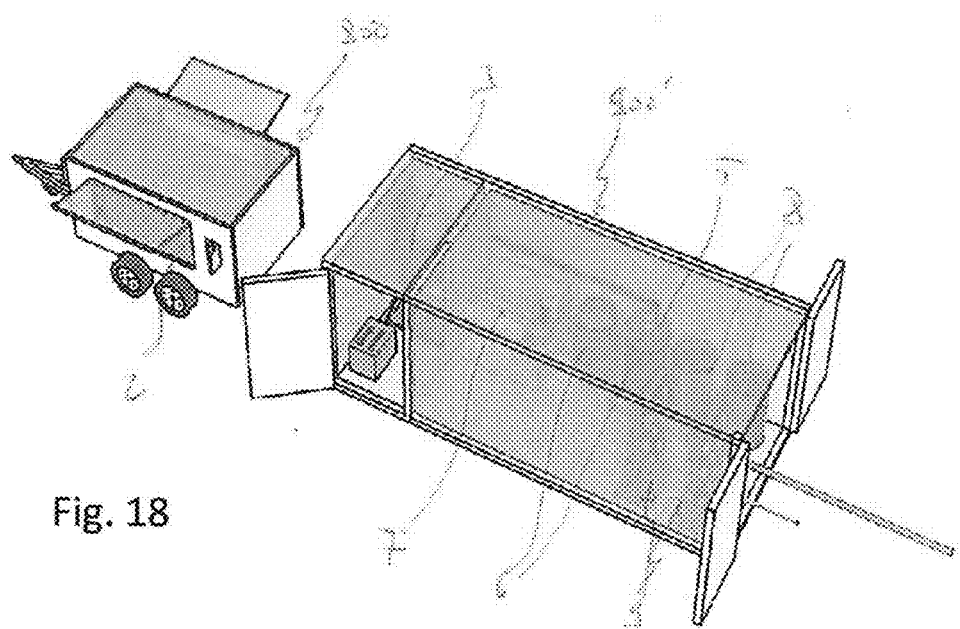
FIG. 18 is a perspective view of another alternative embodiment of the decontamination device according to the invention.

According to another embodiment, with reference to FIG. 18, the device according to the invention may be transported by means of a light trailer (800) which carries the high pressure unit (2) and a large container (900) comprising two compartments (901',902'), the first compartment (901') accommodating the vacuum source (3) and the second compartment (902') accommodating the first filtration system (7) consisting of a filtering press, the second filter system (9) consisting of multiple filters mounted on a vertical panel, for example, the barrels (6), the cyclone head (5) and the buffers tanks (8).

Figure 19:
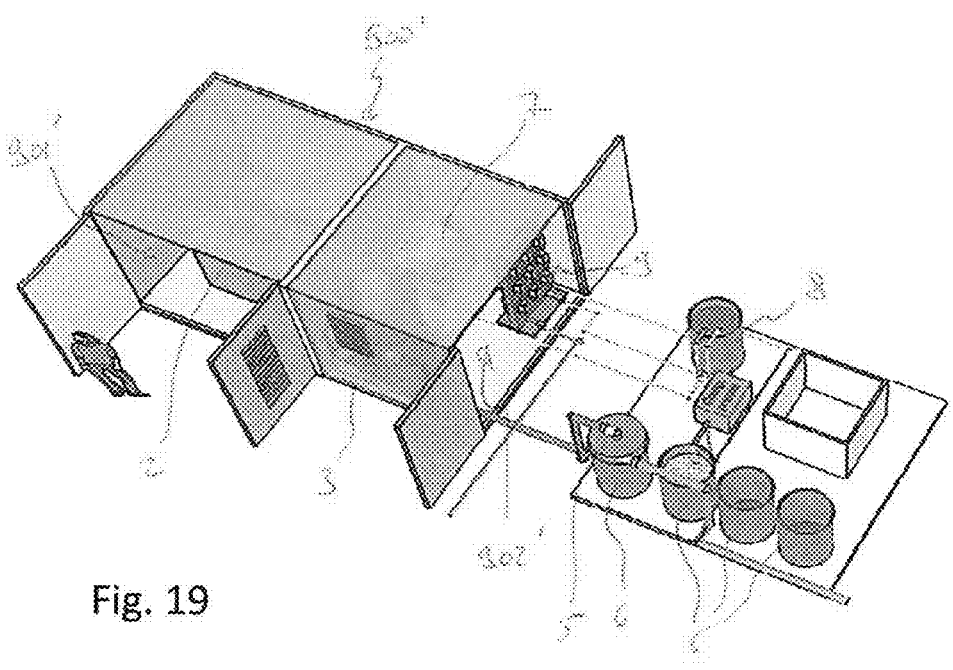
FIG. 19 is a perspective view of another alternative embodiment of the decontamination device according to the invention.

According to another embodiment, with reference to FIG. 19, the device according to the invention may be transported by means of a large container (900') comprising two compartments (901',902'), the first compartment (901') accommodating the high pressure unit (3) and the second compartment (902') accommodating the vacuum source (3), the first filtration system (7) consisting of a filtering press, the second filter system (9) consisting of multiple filters mounted on a vertical panel, for example, the barrels (6), the cyclone head (5) and the buffers tanks (8) being positioned outside the container (900').

Figure 20:
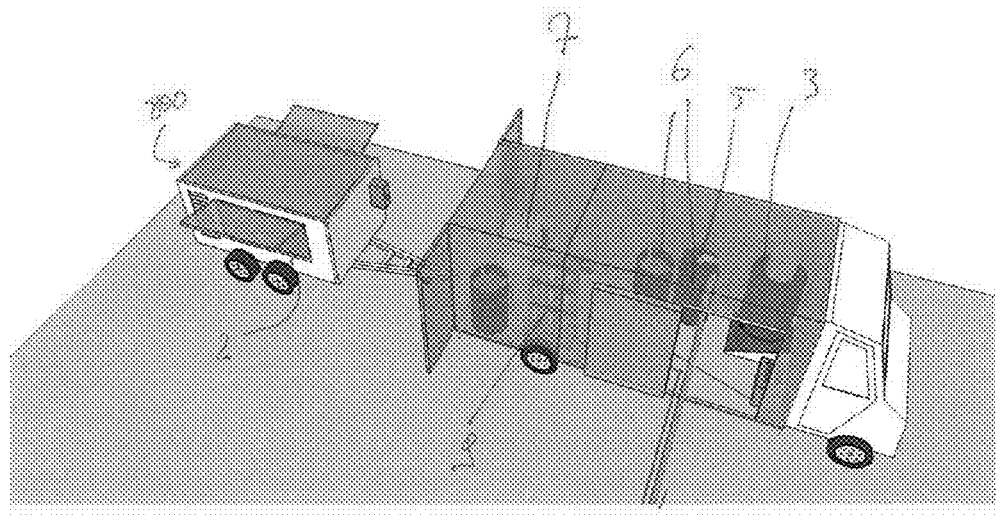
FIG. 20 is a perspective view of a previous embodiment of the decontamination device according to the invention.

According to another embodiment, with reference to FIG. 20, particularly adapted for short duration jobsites, i.e. jobsites of 1 to 2 days, the device according to the invention may be transported by means of a light trailer (800) which carries the high pressure unit (2) and is connected to a van comprising two compartments, the first compartment accommodating the vacuum source (3), the barrels (6) and the cyclone head (5) and the second compartment accommodating the first filtration system (7) consisting of a filtering press and the second filtration system (9) consisting of multiple filters mounted on a vertical panel, for example.

Figure 21:
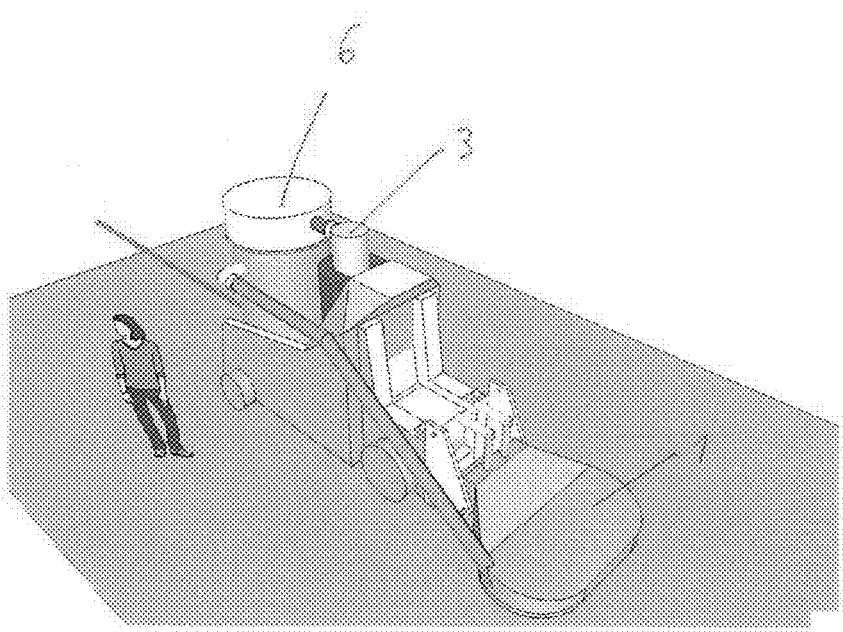
FIG. 21 is a perspective view of an alternative embodiment of the decontamination device, the hydroblasting head of which is mounted on a support trolley for the treatment of industrial surfaces.

In order to treat large surfaces of an industrial floor for example, with reference to FIG. 21, the hydroblasting head (1) may advantageously be mounted in front of a motorised trolley, the vacuum source (3), a barrel (6) provided with a cyclone head (5) being mounted in the rear portion of said trolley. When the barrel (6) is full, it is unloaded so that its contents are treated according to the inventive method. Note that the motorised trolley may include several hydroblasting heads without departing from the scope of the invention.

Figure 22:
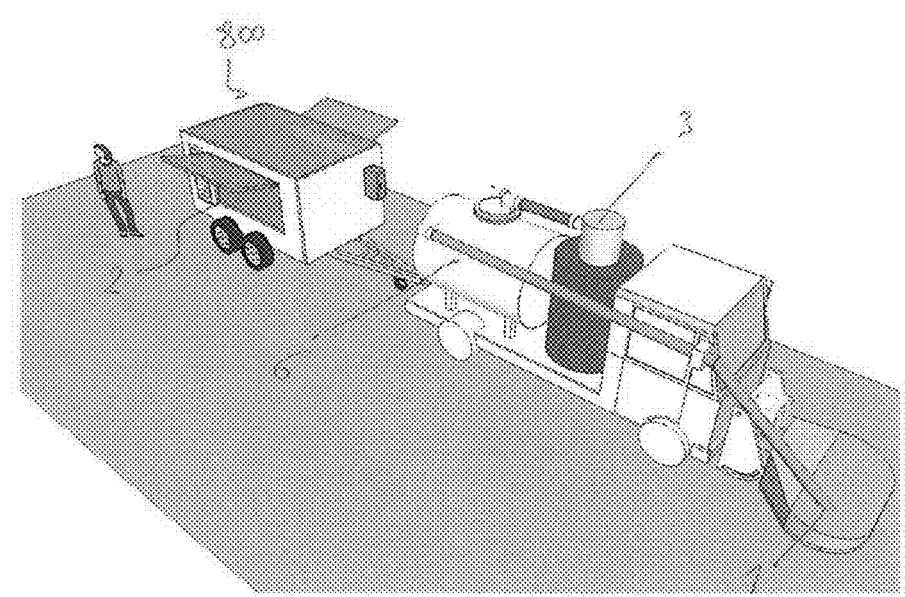
FIG. 22 is a perspective view of an alternative embodiment of the decontamination device according to the invention particularly suitable for the treatment of bituminous mixes.

In order to deal with bituminous materials, with reference to FIG. 22, the device according to the invention can consist of a vehicle comprising at the front one or more hydroblasting head(s) (1) and at the rear a vacuum source (3), a barrel (6) and a cyclone head (5), the said vehicle towing a trailer (800) on which the ultra high pressure unit (2) is positioned.

Figure 23:
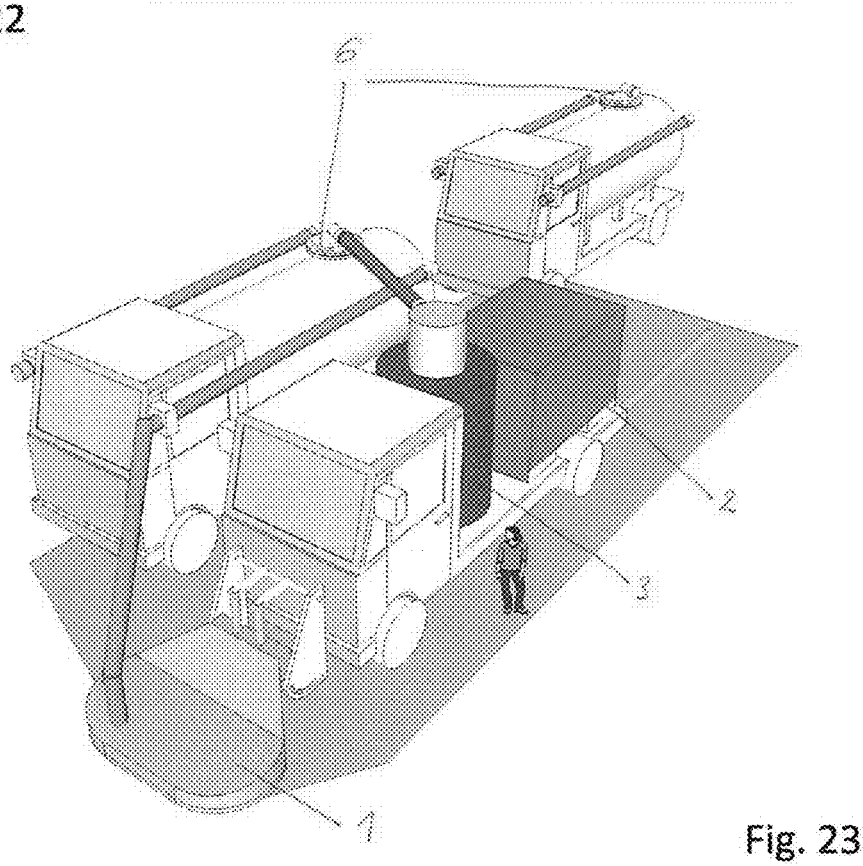
FIG. 23 is a perspective view of another alternative embodiment of the decontamination device according to the invention particularly suitable for the treatment of large bituminous coated surfaces.

According to an alternative embodiment, with reference to FIG. 23, the vehicle has at the front one or more hydroblasting heads (1) and has at the back a vacuum source (3) and an ultra high pressure unit (2) as well as containers (6) consisting of the tanker-truck tanks It is clear that many other configurations for the transportation may be devised without departing from the scope of the invention.

Finally, it is obvious that the examples we have just given are only specific illustrations and in no way exhaustive with regard to the scope of the invention.

The invention claimed is:

1. Device for decontaminating a surface comprising one or more toxic products, the device comprising:
    At least one hydroblasting head comprising a closed volume for drawing a mixture of water, toxic products, and surface residue, the hydroblasting head fed by a high pressure unit;
    a vacuum source connected to the at least one hydroblasting head, the vacuum source comprising a low pressure source connected to a cyclone head mounted on a container which collects water containing toxic products and residues of the surface; and
    a first filtration system comprising a filtering press having an input fed with the water containing toxic products collected in the container and an output feeding a buffer tank, wherein the output water comprises particles less than or equal to 5 µm.

2. The device according to claim 1, wherein the device further comprises a second filtration system comprising a pump provided with at least one filter, the at least one filter adapted to filter particles larger than or equal to 1 µm.

3. The device according to claim 1, wherein the high pressure unit is adapted to deliver a pressure between 300 bars and 7000 bars with a water flow rate between 4 L/min and 200 L/min.

4. The device according to claim 1, wherein the hydroblasting head is mounted on a movable trolley capable of moving along a crossarm of a frame, the crossarm adapted to move along side-members of the frame.

5. The device according to claim 4, wherein the frame is adapted to be mounted on a wall or a ceiling.

6. The device according to claim 4, wherein the frame is mounted on a chassis comprising wheels.

7. The device according to claim 4, wherein the movable trolley comprises a remotely controlled movable trolley.

8. The device according to claim 1, wherein the filtering press comprises at least one chassis provided with two wheels and a handle bar, an air compressor attached to the chassis, a circulation pump driven by compressed air produced by the air compressor, and a filtration and pressing unit.

9. The device according to claim 8, wherein the chassis is mounted on a substantially U-shaped trolley, which comprises four multidirectional wheels with brakes.

10. The device according to claim 8, wherein the filtration and pressing unit comprises an upper plate and an end plate that are connected by at least one connecting rod, a set of filtration plates positioned between the upper plate and the end plate, at least one filtration chamber positioned between two of the filtration plates, a filter cloth extending into the at least one filter chamber, a clamping device adapted to (i) bring the filtration plates to an operating position wherein the at least two of the filtration plates are pressed against each other, and (ii) release the filtration plates in an open position wherein the at least one filter chamber can be opened to release the baled toxic products and surface residue, a removable spacer plate, a pressure plate, and a clamping device providing a pneumatic cushion that is powered by the air compressor.

11. The device according to claim 10, wherein the pneumatic cushion is powered by the air compressor through a first pneumatic circuit comprising a pneumatic control valve, and the air compressor comprises a first compressed air outlet supplying compressed air to the first pneumatic circuit and to the pneumatic cushion and a second compressed air outlet supplying compressed air to a second pneumatic circuit that drives the circulation pump, wherein the pneumatic control valve is controlled by a pressure of the second pneumatic circuit.

12. The device according to claim 1, wherein the high pressure unit is mounted on a mobile chassis.

13. The device according to claim 1, wherein the device further comprises at least one membrane filter for treating water containing toxic products and surface residue collected in the container, the membrane filter providing a first outlet for water more contaminated with materials treated by the first filtration system and a second filtered water outlet connected to one of a sewage system and the high pressure unit.

14. A method for decontaminating a surface comprising one or more toxic products, the method comprising:

a) projecting a high pressure jet in a given closed volume from at least one hydroblasting head upon the surface to remove toxic products and provide a water mixture having toxic products and surface residue,
b) removing the water mixture from the given closed volume with suction and storing the suctioned water mixture in a container, and
c) filtering the water mixture from the container with a filtering press to form wet bales of toxic products and surface residue and filtering press discharge water;

wherein the filtering press discharge water contains particles of toxic products less than or equal to 5 μm.

15. The method according to claim 14, wherein the method further comprises transporting the filtering press discharge water to a buffer tank, and passing the water from the buffer tank through at least one filter to produce a filtered water containing particles smaller than or equal to 1 μm.

16. The method according to claim 14, wherein the method further comprises introducing filler into the container.

17. The method according to claim 16, wherein the filler comprises a hydraulic binder.

18. The method according to claim 16, wherein the filler comprises at least one of a mineral filler, an organic filler, and a chemical filler.

19. The method according to claim 14, wherein the method further comprises, prior to c passing the water mixture from the container through at least one membrane filter, the membrane filter providing a first outlet for water more contaminated treated by a first filtration system and a second filtered water outlet connected to one of a sewage system and the high pressure unit.

* * * * *